US012662378B2

(12) United States Patent
Zhou et al.

(10) Patent No.: US 12,662,378 B2
(45) Date of Patent: Jun. 23, 2026

(54) ALUMINUM OXYNITRIDE POWDER, DIRECT NITRIDATION HIGH-PRESSURE SYNTHESIS METHOD AND APPLICATION THEREOF

(71) Applicants: FUJIAN INSTITUTE OF RESEARCH ON THE STRUCTURE OF MATTER, CHINESE ACADEMY OF SCIENCES, Fuzhou (CN); MINDU INNOVATION LABORATORY, Fuzhou (CN)

(72) Inventors: Youfu Zhou, Fuzhou (CN); Jian Yang, Fuzhou (CN); Wentao Xu, Fuzhou (CN); Maochun Hong, Fuzhou (CN)

(73) Assignees: FUJIAN INSTITUTE OF RESEARCH ON THE STRUCTURE OF MATTER, CHINESE ACADEMY OF SCIENCES, Fuzhou (CN); MINDU INNOVATION LABORATORY, Fuzhou (CN)

( * ) Notice: Subject to any disclaimer, the term of this patent is extended or adjusted under 35 U.S.C. 154(b) by 1254 days.

(21) Appl. No.: 17/454,405

(22) Filed: Nov. 10, 2021

(65) Prior Publication Data

US 2022/0144637 A1      May 12, 2022

(30) Foreign Application Priority Data

Nov. 10, 2020    (CN) ......................... 202011248445.3

(51) Int. Cl.
C01B 21/082        (2006.01)

(52) U.S. Cl.
CPC ...... C01B 21/0825 (2013.01); C01P 2002/72 (2013.01); C01P 2004/03 (2013.01);
(Continued)

(58) Field of Classification Search
CPC .............. C01P 2006/60; C01P 2006/80; C01P 2002/72; C01P 2004/03; C01P 2004/32; C01P 2004/61; C01B 21/0825
See application file for complete search history.

(56) References Cited

FOREIGN PATENT DOCUMENTS

| | | |
|---|---|---|
| CN | 102807370 A | 12/2012 |
| CN | 102838355 B | 10/2013 |

(Continued)

OTHER PUBLICATIONS

Lee et al (NPL: Self-propagating High-temperature Synthesis for Aluminum Oxynitride (AION), Materials Science Forum, vol. 510-511, pp. 662-665, 2006).*

(Continued)

*Primary Examiner* — Smita S Patel
(74) *Attorney, Agent, or Firm* — NKL Law; Allen Xue

(57)        ABSTRACT

Aluminum oxynitride (AlON) powder, a synthesis method thereof by direct nitridation under high pressure and use thereof, which belongs to the field of ceramic powder are presented. In the method, pure-phase AlON powder is synthesized by direct nitridation under high pressure with aluminum powder and alumina powder as starting materials. The powder has a spherical-like morphology, with a particle size ranging from 5 μm to 15 μm. The powder has good dispersibility and uniformity, and higher sintering activity. AlON transparent ceramic (1.2 mm thick) prepared from the AlON powder has a linear transmittance of more than 84%. The batch yield is on kilogram-scale; therefore, the method is suitable for large-scale production of the AlON powder.

8 Claims, 2 Drawing Sheets

(52) U.S. Cl.
CPC ...... *C01P 2004/32* (2013.01); *C01P 2004/61* (2013.01); *C01P 2006/60* (2013.01); *C01P 2006/80* (2013.01)

(56) References Cited

FOREIGN PATENT DOCUMENTS

| CN | 104446496 A | 3/2015 |
| --- | --- | --- |
| CN | 106977208 A | 7/2017 |
| CN | 110272282 A | 9/2019 |
| JP | 2007261888 A | 10/2007 |

OTHER PUBLICATIONS

Zhou et al (CN 104446496, machine translation) published on Mar. 25, 2015.*
Deng et al (CN 102807370, machine translation), published on Dec. 5, 2012.*
Wang (CN108329036, machine translation)—published Jul. 27, 2018.*

* cited by examiner

ALUMINUM OXYNITRIDE POWDER, DIRECT NITRIDATION HIGH-PRESSURE SYNTHESIS METHOD AND APPLICATION THEREOF

TECHNICAL FIELD

The present disclosure relates to the field of ceramic powder preparation, and in particular to AlON powder, a synthesis method thereof by direct nitridation under high pressure and use thereof.

BACKGROUND

Transparent AlON ceramics feature excellent optical and mechanical properties, for example, excellent transmittance from near-ultraviolet (0.2 μm) to mid-infrared (6.0 μm) with the theoretical transmittance up to 85.2%, and mechanical properties such as high strength, high hardness and chemical resistance, and can be widely used in the fields of transparent armor, mid-infrared window, fairing, and the like.

At present, the preparation of AlON transparent ceramic materials of high optical quality still faces many difficulties. Chinese Patent No. CN 102838355B discloses a method for batch preparation of AlON transparent ceramic powder, wherein nano-alumina and activated carbon are used as starting materials, and pure-phase AlON powder can be prepared at 1750° C.; however, the synthesized AlON powder needs to be calcined in the air at 600-640° C. for 2-6 h to remove carbon. Chinese Patent No. CN 110272282A discloses a low-temperature preparation method of AlON transparent ceramic, wherein pure-phase AlON powder is used as a starting material, and the powder after being ball-milled and mixed with a sintering aid, dried and sieved still needs to be calcined in the air at 600-700° C. for 4-20 h to remove carbon. Yuezhong Wang et al. (Thermodynamic Mechanism Study on Synthesis of AlON Powder by Reaction Sintering [C]. Division of Advanced Ceramics, the Chinese Ceramic Society, 2008:30-31) synthesized pure-phase AlON powder by calcination at 1800° C. for 3 h, with micron-scale Al powder and nanoscale $Al_2O_3$ powder used as starting materials. Jicheng Zhou et al. (Study on Synthesis of AlON Powder by Reaction Sintering [J]. Rare Metal Materials and Engineering, 2007(S1):72-75) synthesized pure-phase AlON powder by direct nitridation under the condition of calcination at 1800° C. for 3 h, with micron-scale Al powder and nanoscale $Al_2O_3$ powder used as starting materials. Xuejian Liu et al. (Preparation of AlON Powder by High Temperature Solid Phase Reaction [J]. Journal of Inorganic Materials, 2009, 24(06):1159-1162) synthesized single-phase AlON powder by calcination at 1950° C. for 4 h, with $Al_2O_3$ and AlN used as starting materials. Jianqi Qi et al. (Study on the Preparation of AlON Powder by Solid Phase Reaction Method [J]. Rare Metal Materials and Engineering, 2007(S1):88-91) synthesized pure-phase AlON powder by direct reaction under the condition of calcination at 1800° C. for 2 h, with nanoscale AlN powder and nanoscale $Al_2O_3$ used as starting materials. Xuan Li et al. (Master's thesis, Harbin Institute of Technology, 2015) synthesized single-phase AlON ceramic powder by direct reaction under the condition of calcination at 1800° C. for 2 h, with $Al_2O_3$ and AlN used as starting materials. Huilu Guo et al. (PhD thesis, Shanghai Institute of Ceramics, Chinese Academy of Sciences, 2019) prepared pure-phase AlON powder by carbothermic reduction, and further prepared AlON transparent ceramic by heat preservation at a sintering temperature of 1930° C. for 20 h. In the above methods, the AlON powder prepared by carbothermic reduction needs to be subjected to carbon removal in the air, resulting in an increase of the synthesis process and easy existence of residual carbon, which affects the optical performance of ceramics; the AlON powder synthesized by direct nitridation has average sintering activity, and a high sintering temperature is required for AlON ceramic preparation, which is a tough requirement for sintering equipment; with respect to the synthesis of AlON powder by direct reaction, the starting material AlN is expensive, resulting in a high production cost.

AlON powder of high quality is the key for preparing high-performance AlON transparent ceramic. AlON powder with high purity, good dispersibility, high sintering activity and small particle size is beneficial for obtaining high-performance AlON transparent ceramic. At present, the direct nitridation process is simple and requires no subsequent carbon removal; however, the powder synthesized by this process has average sintering activity, and thus the process still needs to be further improved.

SUMMARY

The present disclosure provides a preparation method of AlON powder, which comprises the following step: synthesizing pure-phase AlON powder by direct nitridation under high pressure with aluminum powder and alumina powder as starting materials, wherein the high pressure refers to a pressure of the gas in the direct nitridation system of 1-3 MPa, such as 1.5-2.5 MPa, and exemplarily 1.0 MPa, 1.1 MPa, 1.2 MPa, 1.5 MPa, 1.8 MPa, 2.0 MPa, 2.5 MPa, 2.8 MPa or 3.0 MPa.

According to an embodiment of the present disclosure, the preparation method comprises the following steps:

(1) mixing: mixing the aluminum powder, the alumina powder and an organic solvent homogeneously;

(2) drying: removing the organic solvent from the mixture obtained in step (1), drying and sieving to obtain a mixed powder;

(3) loading: placing the mixed powder obtained in step (2) in a pressure sintering furnace, and introducing nitrogen to increase the pressure; and (4) calcination: after the loading is completed, calcining the mixed powder to obtain the AlON powder.

According to an embodiment of the present disclosure, in step (1), the organic solvent is at least one of absolute ethanol, diethyl ether, acetone and petroleum ether; preferably, the organic solvent is absolute ethanol.

According to an embodiment of the present disclosure, in step (1), the mass of the organic solvent is 1-3 times, such as 1.5-2.5 times, and exemplarily 1, 1.5, 2, 2.5 or 3 times the sum of the masses of the alumina powder and the aluminum powder.

According to an embodiment of the present disclosure, in step (1), the mixing is performed by a mixing method known in the art, such as mechanical stirring, preferably mechanical stirring for 1-4 h.

According to an embodiment of the present disclosure, in step (1), the alumina powder is selected from at least one of α-alumina powder and γ-alumina powder.

According to an embodiment of the present disclosure, in step (1), the alumina powder has a particle size of no more than 80 μm, preferably no more than 60 μm, more preferably no more than 35 μm, still more preferably no more than 10 μm, and exemplarily 0.5 μm, 1 μm, 3 μm, 5 μm, 8 μm or 10 μm.

According to an embodiment of the present disclosure, in step (1), the alumina powder has a purity of more than 99.9%.

According to an embodiment of the present disclosure, in step (1), the aluminum powder has a particle size of no more than 80 μm, preferably no more than 60 μm, more preferably no more than 35 μm, still more preferably no more than 10 μm, and exemplarily 0.5 μm, 1 μm, 2 μm, 5 μm, 8 μm or 10 μm.

According to an embodiment of the present disclosure, in step (1), the aluminum powder has a purity of more than 99.9%.

According to an embodiment of the present disclosure, in step (1), the amount of the alumina powder and the aluminum powder is calculated based on the stoichiometric ratio of the AlON phase.

According to an embodiment of the present disclosure, removing the organic solvent in step (2) can be performed by a method known in the art, such as removing the organic solvent by rotary evaporation.

According to an embodiment of the present disclosure, drying in step (2) can be performed by a drying method known in the art, such as vacuum drying. Further, the vacuum drying is performed at 50-70° C., such as 55-65° C., and exemplarily 60° C. Further, the vacuum drying is performed for 3-6 h, such as 3.5-5 h, and exemplarily 4 h.

According to an embodiment of the present disclosure, step (2) comprises the following procedures: placing the mixture obtained in step (1) in a flask, removing the organic solvent in a rotary evaporator, drying in a vacuum dryer at 60° C. for 4 h, and then sieving. By rotary evaporation in combination with vacuum drying, the starting materials of the powder can be further mixed as they are being dried, thereby improving the efficiency of drying the starting materials of the ceramic powder and avoiding long-time soaking and uneven mixing. The dried powder is then sieved to obtain homogenously mixed powder of the alumina powder and the aluminum powder.

According to an embodiment of the present disclosure, sieving in step (2) is performed using a 100-mesh sieve.

According to an embodiment of the present disclosure, the mass of the Al powder in the mixed powder in step (2) and step (3) is 27-33 mol %, such as 28-32 mol %, and exemplarily 27 mol %, 28 mol %, 29 mol %, 30 mol %, 31 mol % or 32 mol %, based on the molar percentage of AlN in the AlON phase.

According to an embodiment of the present disclosure, step (3) comprises the following steps: placing the mixed powder obtained in step (2) in crucibles, placing the crucibles in a pressure sintering furnace, and introducing nitrogen to increase the pressure.

According to an embodiment of the present disclosure, in step (3), the amount of the mixed powder loaded is 0.3-0.7, such as ½ to ⅔, and exemplarily ½ or ⅔ of the capacity of the crucible.

According to an embodiment of the present disclosure, in step (3), the crucibles are stacked, preferably stacked in a staggered manner.

According to an embodiment of the present disclosure, in step (3), the mixed powder is placed in a plurality of crucibles, and the crucibles are stacked in a staggered manner in the pressure sintering furnace. By stacking the crucibles and presetting gaps between the crucibles for powder loading, the space of the furnace can be effectively utilized, thereby improving the batch yield.

According to an embodiment of the present disclosure, in step (3), the furnace is at a vacuum degree of no less than $10^{-2}$ Pa at room temperature before the nitrogen is introduced.

According to an embodiment of the present disclosure, in step (3), the nitrogen has a purity of no less than 99.9%.

According to an embodiment of the present disclosure, in step (3), the nitrogen is introduced until the pressure sintering furnace has an internal gas pressure of 1-3 MPa, such as 1.5-2.5 MPa, and exemplarily 1.0 MPa, 1.1 MPa, 1.2 MPa, 1.5 MPa, 1.8 MPa, 2.0 MPa, 2.5 MPa, 2.8 MPa or 3.0 MPa.

According to an embodiment of the present disclosure, in step (4), the calcination is performed at 1700-1800° C., such as 1720-1780° C., and exemplarily 1700° C., 1720° C., 1750° C., 1780° C. or 1800° C.

According to an embodiment of the present disclosure, in step (4), the calcination is performed for 1-3 h, such as 1.2-2.8 h, and exemplarily 1 h, 1.5 h, 2 h, 2.5 h or 3 h.

According to an embodiment of the present disclosure, in step (4), after the calcination is completed, the temperature is lowered to 900-1100° C. (such as 950-1050° C., preferably 1000° C.), and the pressure is relieved to allow further cooling.

According to an embodiment of the present disclosure, in step (4), the rate of heating and/or cooling is 5-12° C./min, preferably 8-10° C./min.

According to an embodiment of the present disclosure, step (4) comprises: under the nitrogen pressure in step (4), heating to 1700-1800° C. for calcination for 1-3 h, then lowering the temperature to 900-1100° C., and gradually relieving the pressure until the furnace is cooled to room temperature.

The present disclosure further provides AlON powder having a purity of at least 99.9%.

According to an embodiment of the present disclosure, the AlON powder has a nitrogen content of 3.8-4.94%, preferably 4.35-4.90%, such as 3.91%, 3.95%, 4.0%, 4.2%, 4.4%, 4.49%, 4.56%, 4.60%, 4.70%, 4.80% or 4.89%.

According to an embodiment of the present disclosure, the AlON powder has a particle size of 5-15 μm, such as 7-12 μm and exemplarily 5 μm, 6 μm, 7 μm, 8 μm, 9 μm, 10 μm, 11 μm, 12 μm, 13 μm, 14 μm or 15 μm.

According to an embodiment of the present disclosure, the AlON powder is spherical-like or spherical.

According to an embodiment of the present disclosure, the AlON powder has an XRD spectrum substantially as shown in FIG. 1.

According to an embodiment of the present disclosure, the AlON powder has an SEM morphology substantially as shown in FIG. 2.

Preferably, the AlON powder is prepared by the above-mentioned method.

The present disclosure further provides use of the AlON powder in preparing AlON ceramic.

The present disclosure further provides AlON ceramic prepared from a starting material containing the above-mentioned AlON powder.

According to an embodiment of the present disclosure, the AlON ceramic has a linear transmittance of more than 80%, such as more than 84%.

Beneficial Effects of Present Disclosure

In the present disclosure, aluminum powder and alumina powder are used as starting materials, and after mixing the starting materials quickly by mechanical stirring, removing the organic solvent by rotary evaporation and vacuum drying, pure-phase AlON powder is synthesized by direct nitridation under high pressure. The wet mixing method at room temperature is adopted, which features a short mixing time, low requirements for mixing equipment and simple operation. By stacking the crucibles and presetting gaps between the crucibles for powder loading, the working space of the pressure sintering furnace can be effectively utilized, thereby facilitating large-scale synthesis of the AlON powder. The high-pressure nitrogen is effectively involved in the direct nitridation reaction, leading to a short synthesis time and facilitated permeation of nitrogen into AlON crystal lattices, which improves nitrogen content in the synthesized AlON powder, and at the same time inhibits grain growth and improves sintering activity of the powder. The synthesized AlON powder has a spherical-like morphology, with a particle size ranging from 5 μm to 15 μm, and has good dispersibility and uniformity. The batch yield is on kilogram-scale; therefore, the method is suitable for large-scale production.

The high-activity AlON powder is subjected to heat preservation at a lower sintering temperature (1830° C.) for 4-8 h to prepare a high-performance AlON transparent ceramic sheet, and the ceramic sheet with a thickness of 1.2 mm has a linear transmittance of more than 84%. Compared with the AlON transparent ceramic prepared by the current method in the art, the AlON transparent ceramic prepared from the AlON powder synthesized by the method described herein has a decrease of about 100° C. in the sintering temperature and a reduced heat preservation time of 4-8 h, indicating that the AlON powder synthesized herein has higher sintering activity and is suitable for preparing high-performance AlON transparent ceramics.

DETAILED DESCRIPTION

The technical solution of the present disclosure will be further illustrated in detail with reference to the following specific examples. It should be understood that the following examples are merely exemplary illustration and explanation of the present disclosure, and should not be construed as limiting the protection scope of the present disclosure. All techniques implemented based on the aforementioned content of the present disclosure are encompassed within the protection scope of the present disclosure.

Unless otherwise specified, the starting materials and reagents used in the following examples are all commercially available products or can be prepared by known methods.

In the examples, X-ray diffraction pattern analysis was performed using an X-ray diffraction analyzer (Miniflex-600, Rigaku, Japan).

In the examples, the linear transmittance of AlON transparent ceramic was measured using an ultraviolet-visible-near infrared spectrophotometer (Lambda950, Perkin Elmer, USA).

In the examples, scanning electron microscopy (SEM) was performed using a scanning electron microscope (SU-8010, Hitachi, Japan).

Example 1: Synthesis of AlON Powder by Direct Nitridation Under High Pressure (1) Mixing: the amount of alumina powder and aluminum powder was calculated based on the stoichiometric ratio of the AlON phase; α-alumina powder (with a particle size of 0.5 μm) and aluminum powder (with a particle size of 2 μm) were weighed as desired into the same polytetrafluoroethylene plastic vessel, and absolute ethanol was added in an amount 2 times the sum of the masses of the alumina powder and the aluminum powder, followed by mixing by mechanical stirring.

(2) Drying: the ceramic slurry homogeneously mixed in step (1) was placed in a round-bottom flask, then evaporated in a rotary evaporator to remove the organic solvent, dried in a vacuum dryer at 60° C. for 4 h, and sieved with a 100-mesh sieve to obtain mixed powder of the alumina powder and the aluminum powder, wherein the mass of the aluminum powder was 30 mol % based on the molar percentage of AlN in the AlON phase.

(3) Loading: the mixed powder obtained in step (2) was placed in cylindrical boron nitride crucibles, each of which was loaded with the mixed powder at a height of ⅔ of the capacity of the boron nitride crucible; four crucibles were sequentially stacked in a staggered manner and placed in a pressure sintering furnace, which was then slowly vacuumized and was charged with high-purity nitrogen until the pressure reached 1.2 MPa.

(4) Calcination: the pressure sintering furnace was heated at a rate of 10° C./min to 1750° C. for calcination for 2 h, and then cooled to 1000° C. at a rate of 8° C./min; the pressure was gradually relieved until the furnace cooled to room temperature to obtain AlON powder.

Figure 1:
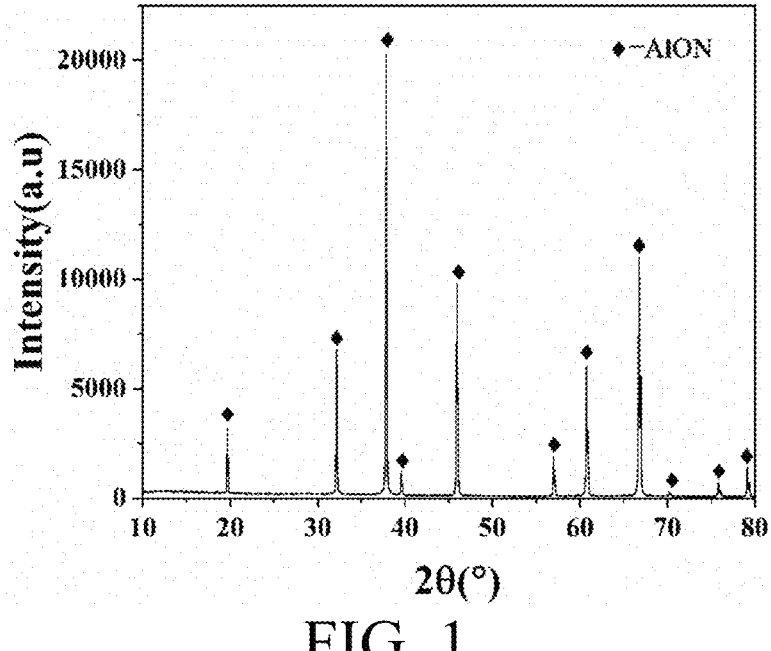
FIG. 1 is an XRD spectrum of the AlON powder synthesized in Example 1.

As shown in FIG. 1, the obtained product was pure-phase AlON powder as identified by X-ray diffraction analysis. The AlON powder had a purity of 99.9%, and a nitrogen content of 4.56%.

Figure 2:
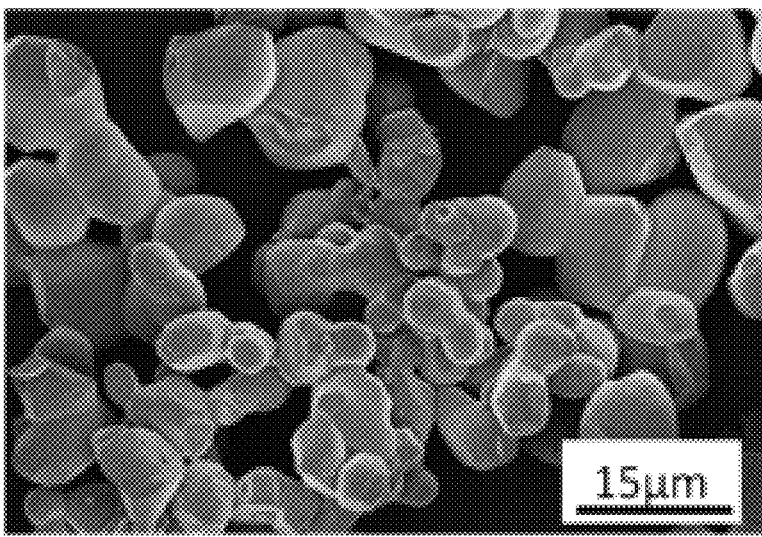
FIG. 2 is an SEM image of the AlON powder synthesized in Example 1.

As shown in FIG. 2, the AlON powder was spherical-like, with a particle size of 5-15 μm.

Example 2

This example is substantially the same as Example 1, except that:

(3) Loading: the mixed powder obtained in step (2) was placed in cylindrical boron nitride crucibles, each of which was loaded with the mixed powder at a height of ½ of the capacity of the boron nitride crucible; four crucibles were sequentially stacked in a staggered manner and placed in a pressure sintering furnace, which was then slowly vacuumized and was charged with high-purity nitrogen until the pressure reached 2.5 MPa.

(4) Calcination: the pressure sintering furnace was heated at a rate of 15° C./min to 1750° C. for calcination for 3 h, and then cooled to 1000° C. at a rate of 10° C./min, and the pressure was gradually relieved until the furnace cooled to room temperature to obtain AlON powder.

The AlON powder had a purity of 99.9%, and a nitrogen content of 4.89%.

Example 3: Preparation of AlON Transparent Ceramic Sample (1) Ball-milling: the AlON powder prepared in Example 1 was sieved with a 100-mesh nylon sieve; 40 g of the sieved powder, 0.2 wt % yttrium oxide and 0.1 wt % magnesium oxide were weighed and placed in a nylon ball-milling tank; with alumina used as the ball-milling medium and absolute ethanol used as the dispersion medium, the mixture was ball-milled in a planetary ball mill at 250 r/min for 24 h.

(2) Drying and shaping: the AlON ceramic powder slurry obtained in step (1) was dried in a vacuum dryer at 60° C. for 6 h, sieved with a 150-mesh nylon sieve, and dry-pressed and cold isostatic-pressed on a hydraulic press machine and a cold isostatic press machine under the pressures of 20 Mpa and 200 Mpa respectively to obtain AlON ceramic biscuit.

(3) Sintering: the AlON biscuit obtained in step (2) was loaded in a boron nitride crucible, which was then placed in a carbon tube sintering furnace; after the furnace was vacuumized to $10^{-3}$ Pa at room temperature, the extraction valve was closed, and high-purity nitrogen was introduced into the furnace; when the nitrogen pressure was slightly positive, the outlet valve was opened to adjust the nitrogen flow rate to be 0.3 L/min; under the condition of flowing nitrogen, the furnace was heated to 1640° C. at a rate of 10° C./min, and then heated to 1830° C. at a rate of 6° C./min, and maintained at this temperature for 6 h; after the sintering was completed, the furnace was cooled to 900° C., and then the power was turned off to allow further cooling; AlON transparent ceramic was obtained.

(4) Post-treatment: the AlON transparent ceramic obtained in step (3) was ground and polished on both sides to obtain the AlON transparent ceramic.

Figure 4:
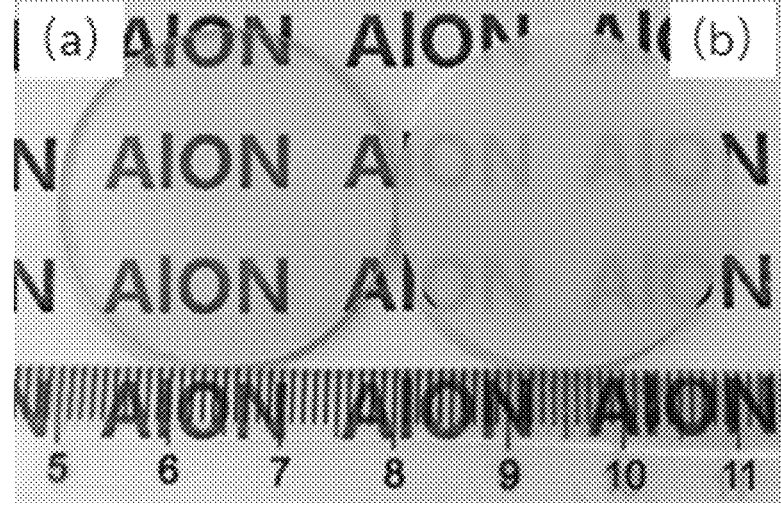
FIG. 4 is a photograph of transparent ceramic samples prepared in Example 3 and Comparative Example.

The obtained sample was pure-phase AlON as identified by X-ray diffraction and ultraviolet-visible-near infrared spectrophotometer, with a linear transmittance of more than 84%, suggesting a transparent ceramic (as shown in (a) in FIG. 4).

Comparative Example

This example differed from Example 1 in that: the mixed powder obtained in step (2) was loaded in a boron nitride crucible, which was then placed in a carbon tube sintering furnace; after the furnace was vacuumized to $10^{-3}$ Pa at room temperature, the extraction valve was closed, and high-purity nitrogen was introduced into the furnace; when the nitrogen pressure was slightly positive, the outlet valve was opened to adjust the nitrogen flow rate to be 0.3 L/min; under the condition of flowing nitrogen, the furnace was heated to 1750° C. at a rate of 10° C./min and maintained at this temperature for 3 h; after the calcination was completed, the furnace was cooled to 900° C. at a rate of 8° C./min, and then the power was turned off to allow further cooling; AlON powder was obtained. The AlON powder had a purity of 98.9%, and a nitrogen content of 4.32%.

The preparation process of the corresponding transparent ceramic sample was the same as that of Example 3.

As shown in (b) in FIG. 4, the ceramic sample prepared in this comparative example is a translucent AlON ceramic, with a linear transmittance of less than 10%.

8

Figure 3:
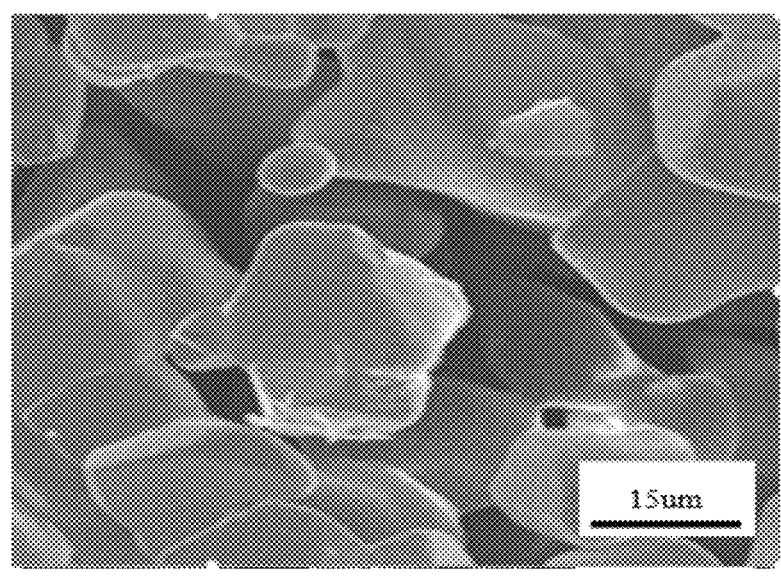
FIG. 3 is an SEM image of the AlON powder synthesized under normal pressure in Comparative Example.

As shown in FIG. 3, the AlON powder synthesized by direct nitridation had irregular morphology accompanied with agglomeration, and it had a large particle size and low sintering activity.

The embodiments of the present disclosure have been described above. However, the present disclosure is not limited to the above embodiments. Any modifications, equivalents, improvements and the like made within the spirit and principle of the present disclosure shall fall within the protection scope of the present disclosure.

The invention claimed is:

1. A preparation method of AlON powder by direct nitridation, comprising:
   step (1), mixing an aluminum powder, an alumina powder and absolute ethanol homogeneously to form a mixture;
   step (2), removing the absolute ethanol from the mixture by rotary evaporation, followed by vacuum drying and sieving to obtain a mixed powder;
   step (3), loading the mixed powder in a plurality of crucibles, stacking the plurality of crucibles in a staggered manner in a pressure sintering furnace, and introducing nitrogen to the pressure sintering furnace until an internal gas pressure thereof is 1.5-3.0 MPa; and
   step (4), calcining the mixed powder at 1700-1800° C. in the pressure sintering furnace for 1-3 h, reducing the temperature to 900-1100° C., relieving the internal gas pressure in the pressure sintering furnace and cooling the temperature therein to room temperature to obtain the AlON powder,
   wherein the AlON powder has a purity of at least 99.9%.

2. The method according to claim 1, wherein, in step (1), a mass of the absolute ethanol is 1-3 times a sum of the masses of the alumina powder and the aluminum powder; and
   the mixing is mechanical stirring for 1-4 h.

3. The method according to claim 1, wherein the alumina powder is selected from at least one of α-alumina powder and γ-alumina powder;
   the alumina powder has a particle size of no more than 80 μm;
   the alumina powder has a purity of more than 99.9%;
   the aluminum powder has a particle size of no more than 80 μm; and
   the aluminum powder has a purity of more than 99.9%.

4. The method according to claim 1, wherein sieving is performed using a 100-mesh sieve.

5. The method according to claim 1, wherein, in step (3), the pressure sintering furnace is at a vacuum degree of no less than $10^{-2}$ Pa at room temperature before the nitrogen is introduced;
   the nitrogen has a purity of no less than 99.9%;
   the nitrogen is introduced until the pressure sintering furnace has an internal gas pressure of 1.5-2.5 MPa; and
   in step (4), the pressure sintering furnace is heated and/or cooled at a rate of 5-12° C./min.

6. The method according to claim 1, wherein the alumina powder has a particle size of no more than 60 μm, the aluminum powder has a particle size of no more than 60 μm.

7. The method according to claim 1, wherein the alumina powder has a particle size of no more than 35 μm, the aluminum powder has a particle size of no more than 35 μm.

8. The method according to claim 1, wherein the alumina powder has a particle size of no more than 10 μm, the aluminum powder has a particle size of no more than 10 μm.

\* \* \* \* \*